United States Patent [19]

Rubenstein

[11] E Re. 28,953

[45] Reissued Sept. 7, 1976

[54] HYDROSTATIC TRANSMISSION CHECK VALVES WITH AUTOMATIC UNLOADING

[75] Inventor: Raymond D. Rubenstein, La Grange Park, Ill.

[73] Assignee: International Harvester Company, Chicago, Ill.

[22] Filed: July 2, 1975

[21] Appl. No.: 592,570

Related U.S. Patent Documents

Reissue of:

[64] Patent No.: 3,788,078
Issued: Jan. 29, 1974
Appl. No.: 291,499
Filed: Sept. 22, 1972

[52] U.S. Cl. ..... 60/464; 60/488

[51] Int. Cl.[2] ..... F16H 39/10

[58] Field of Search ..... 60/464, 465, 466, 468, 60/488

[56] References Cited

UNITED STATES PATENTS

| | | | |
|---|---|---|---|
| 3,230,699 | 1/1966 | Hann et al. | 60/464 X |
| 3,360,933 | 1/1968 | Swanson et al. | 60/464 |
| 3,398,531 | 8/1968 | Swanson et al. | 60/465 X |

*Primary Examiner*—Edgar W. Geoghegan
*Attorney, Agent, or Firm*—William H. Wendell; Floyd B. Harman

[57] ABSTRACT

Hydrostatic transmission having a crossover which is provided with check valves. The check valves are automatically controlled by a series of power chambers that respond to different hydrostatic pressures.

6 Claims, 1 Drawing Figure

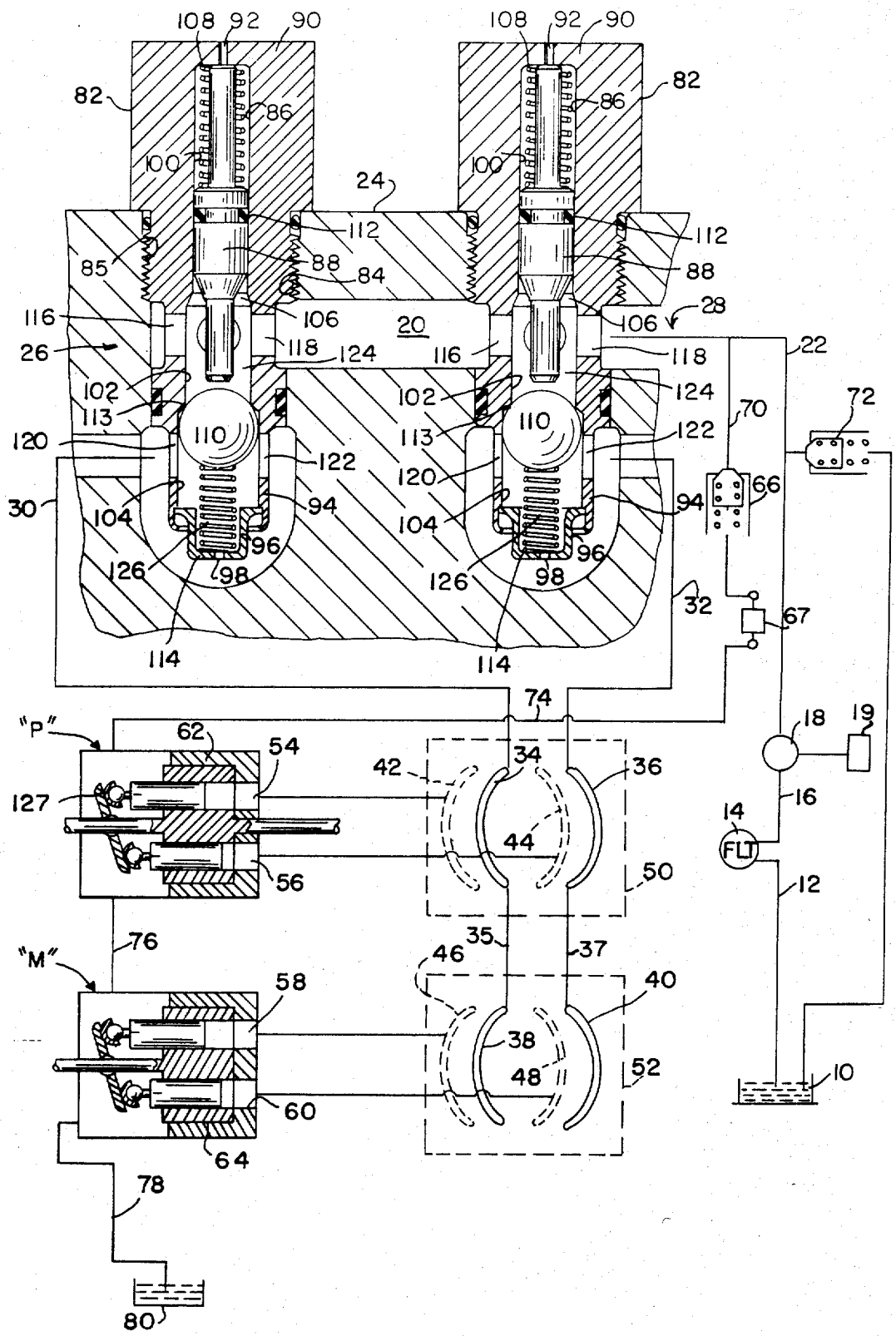
108
92
90
82
86
100
24
112
88
84
85
116
106
20
28
26
118
124
22
102
113
110
120
122
70
72
30
104
94
96
126
98
66
32
67
114
74
"P"
62
54
127
42
34
36
44
56
50
18
19
16
14
FLT
12
76
"M"
35
37
46
58
40
38
48
52
60
64
10
78
80

HYDROSTATIC TRANSMISSION CHECK VALVES WITH AUTOMATIC UNLOADING

Matter enclosed in heavy brackets [ ] appears in the original patent but forms no part of this reissue specification; matter printed in italics indicates the additions made by reissue.

This invention relates to hydrostatic transmissions, and more particularly to the provision of an automatic unloading valve means for hydraulic system charging and bypass purposes. The provision of valving means interconnected between opposite sides of a hydrostatic loop and a hydrostatic transmission to facilitate a charging system are known in the art, as evidenced by U.S. Pat. No. 3,360,933, issuing to Swanson et al. The forces on the check pins which regulated the interconnecting system, however, must be strong enough to overcome the pressure of the charge pump, which was only about 100 psi. However, with the addition of a hydraulic lift unit to the system problems develop, in that the force of the check means had to be strong enough to overcome the maximum relief pressure of the implement circuit, which is in the range of 650 psi.

It is therefore an object of the present invention to provide an automatic check valve means for a hydrostatic transmission system having an attached hydraulic lift unit.

Another object of the present invention is to provide a check valve means which adds hydraulic fluid to the system upon a loss therefrom.

Yet another object of this invention is to provide an automatic crossover system to unload oil trapped in the drive loop when the engine is stopped.

SUMMARY OF THE INVENTION

In accordance with the invention a hydraulic transmission system having a hydraulically actuated implement assembly associated therewith is provided with a series of automatic unloading check valve means. The valves include spools, the positions of which are controlled by a series of actuating means, such as power chambers, which they interconnect. Upon actuation of the hydraulic system, pressure in some of the power chambers causes the spools to move and close off the crossover and allow the charging of the system. Correspondingly upon de-actuation, another series of spring assisted power chambers shift the spools such that the cross-over is opened and the vehicle can free wheel.

The foregoing and other objects and features of the invention will become more apparent as the disclosure is more fully made in the following detailed description of a preferred embodiment thereof as is illustrated in the accompanying sheet of drawings in which the FIGURE is a generally schematic representation but with portions thereof shown in cross section, of the hydraulic circuit for a hydrostatic transmission system with a hydraulic lift incorporating the present invention therein.

Reference is now made to the drawing wherein the proposed valving mechanism is depicted. In the preferred embodiment the proposed valving mechanism is incorporated in a tractor vehicle, as more fully disclosed in U.S. Pat. No. 3,360,933 issued to Swanson et al. This FIGURE illustrates a schematic representation of the hydraulic circuitry involved in the hydraulic transmission and implement lift means as well as the automatic check valve means. Referring thereto it will be seen that a reservoir 10 containing a source of liquid is connected by a passage 12 with a conventional filter unit 14. Fitler means 14 is connected by way of a passage 16 with a hydraulic charge pump 18. Charge pump means 18, may be of conventional construction, for instance, any of the well known internal gear or gear within a gear type unit now available on the commercial markets. The charge pump means 18 is connected with chamber means 20 by passage means 22, chamber means 20 being located in a housing means 24. The chamber means 20 is, in turn, connected with valve unit means 26 and 28, and through the latter valve units and by way of passages 30, and 32 with the kidney shaped ports 34, 36 and 38, 40. These kidney shaped ports are in fluid communication with the kidney shaped ports 42, 44 and 46, 48 of the respective valve plates 50 and 52. The latter plate ports, in turn, are in fluid communication with ports 54, 56 and 58, 60 which open into the cylinders of the respective pump 62 and motor 64 means. The hydraulic circuit interconnecting the pump unit P with the motor unit M is commonly termed the hydrostatic loop of a hydrostatic transmission [.] *, which includes passages 35 and 37 establishing fluid communication between ports 34 and 38, and ports 36 and 40, respectively.*

A conventional implement control valve 66 provides a means of pressure regulation in the hydraulic implement unit as well as a lubrication means. Both the check valve means 26 and 28, and the hydraulic implement unit, which in preferred form is a hydraulic lift means [(not shown)] *67* are connected in passage means 70 as is the charge pump 18. When the pressure in this circuit rises, a second check valve means for implement pressure relief means 72 opens to dump excessive fluid to [dump means] *reservoir* 10. Excessive fluid from hydraulic lift means, by way of connecting passage means 74, dumps to the interior of pump unit P and by way of connecting passage 76 to motor unit M, to provide lubrication for the pump and motor units. Drainage of fluid from said motor unit may be effected through an outlet and passage means 78 to a reservoir means 80.

Now in accordance with the more specific teachings of the present invention reference is made to the valve units indicated generally by reference numbers 26 and 28. However, since these valve units are identical in construction a detailed description of only one thereof need to be included herein. Each valve unit includes a valve body or housing means 82 with external threads 84 thereon for threadable securement with a complementary threaded bore 85 in the assembly housing 24. [A] *They also utilize a spool means which includes a* multi-diametered central bore means 86 extends part of the length of said body means and slidingly accommodates a spring loaded actuator or pin member means 88. Said bore means 86 is closed at first end 90 with the exception of a small air vent 92 being provided therein, while second end 94 carries a spring supporting means 96, which is also provided with a small vent orifice 98. The bore means 86 is further divided into first, second and third diameter area means 100, 102 and 104. The first area or portion 100 slidingly accommodates said actuator means 88 and is connected to second bore means 102 by a beveled shoulder means 106. A spring means 108 of an expansion nature continuously urges pin member means 88 downwardly against [said] *the* ball means 110. A fluid seal means 112 is provided in pin member means 88 to prevent the escape of high pressure fluid upwardly through air vent 92. a second beveled edge means 113 is provided at the juncture of second bore means 102 and third bore means 104 functioning as a seat for bail means 110, which is continuously urged upwardly by spring means 114.

A series of transversely disposed channel means 116, 118, 120 and 122 open into *the second and* third vertical bore means 102 and 104 respectively. As is apparent, channel means 116 and 118 via passage means 22 are connected with pump means 18 and via passage means 32 and 30 to motor M. As is further apparent, first and second power chamber means 124 and 126 are created by this arrangement, the movement and separation of ball means 110 and pin member means 88 [ depends ] *being dependent* upon the respective pressures of the fluid and spring forces in each chamber.

In operation of the combination herein disclosed, it will be assumed that the swash plate means [ 126 ] *127* of pump 62 is in a non-angled position, that is in a zero displacement position. Assuming this condition and the fact that the engine means *19* used to actuate the entire system is stopped, the entire hydrostatic loop will be de-pressurized. In this state trapped high pressure fluid in power chamber 124, will exert a downward force on ball means 110. The decrease pressure will permit spring means 108 to drive pin member means 88 down against ball means 110 thereby causing ball means 110 to be displaced downwardly thus, establishing fluid communication from chamber means 20 through bore means 102 and into passage means 30 or 32. At this time free fluid communication is established between ports 34 and 36 and interconnecting chamber 20 whereby fluid is recirculated around the pump [circuit.] *through passages 35 and 37. If this* [ if the ] crossover were not established when the tractor tried to roll down a hill, for example, the wheels would drive the motor through the gear transmission. The motor, thus, acts as a pump and delivers fluid to the pump. However, due to the friction in the engine, movement of the pump is retarded and thereby a braking action results. As is apparent, the crossover allows the motor to pump freely thereby avoiding any braking. Upon actuation of the engine means [(not shown)] *19*, hydraulic fluid is circulated by charge pump means 18 such that the hydrostatic loop is pressurized. As is apparent, ball means 110 sees the same pressure in first power chamber 124 and second power chamber 126. This force plus force contributed by spring means 114 results in the urging of ball means 110 into a seated relationship with shoulder means 113. Simultaneously therewith, pin member means 88 reacts to the forces generated in power chamber 124 and is slidably urged upwardly against spring means 108, and thus, the crossover which allowed free wheeling is automatically closed and the hydrostatic loop is placed in a condition to react to a forward or reverse command. [ As in ] *In* the prior art, it was possible to manually hold open the check valve means whereby the crossover was established preventing power from being transmitted to the wheels even if the swash plate was angled. With implement systems being included in the hydrostatic loop the pressures which were necessary to properly actuate the implement system were often times sufficient to physically destroy the manual check valve means. As is apparent, upon over-coming of the manual check valve means, by pressures which approach 560 psi, the vehicle would immediately start moving as determined by the swash plate setting.

Upon the angling of swash plate means [ 126, ] *127*, high pressure will be delivered from the pump to the motor means, and one of the hydraulically actuated check valve means 26 or 28 will see the pressure coming directly off the drive member. This high pressure fluid will flow through the second power chamber means of said one of said check valve means, said other check valve means as a result will see low pressure as fluid is returned to the [ driving means. ] *pump P.* Because the pressure in the second power chamber of the check valve, on the return side of the hydrostatic loop, may be lower due to fluid loss, etc. than that in the first power chamber the ball means may be urged downwardly and makeup fluid will be supplied by the charge pump 18.

As is apparent, all of these operations occur automatically and remove the possibility of operator error or mistake. Upon the de-actuation of the engine means (not shown) the pressure in the hydrostatic loop falls and pin member means 88 is urged downwardly by spring means 108 whereupon ball means 110 is displaced and the crossover [ means ] is immediately established.

The advantage to be gained is that when parking on a slope it is not possible to use, for any length of time, the hydrostatic transmission as a brake. Since as soon as the engine means is shut off the crossover is established and the vehicle will start to roll and thus the operator will be immediately reminded to set the parking brake. Without the automatic crossover the transmission would temporarily hold as a brake until the fluid leaked out whereupon the vehicle would roll free.

Thus, it is apparent that there has been provided, in accordance with the invention, a hydraulic system that fully satisfies the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a vehicle having an engine, [ and traction wheels with ] a hydraulic transmission, [ and ] a hydraulically actuated implement means operatively connected therebetween, *a fluid charge pump driven by said engine and communicatively connecting said transmission to a fluid source, said transmission having* [ including ] a pump and motor, first conduit means connecting the pump outlet with the motor inlet and second conduit means connecting the motor outlet with the pump inlet so that the pump supplies fluid under pressure to drive the motor, and a variable angle swash plate mechanism in the pump operable for varying the transmission ratio of the transmission and for controlling direction of fluid flow between pump and motor according to desired vehicle movement [ and a fluid charge pump driven by the engine and communicatively connected to a fluid source, ] the combination therewith of automatic [ , ] valving means communicatively interconnectable between said charge pump and the first and second conduit means [ interconnecting said pump and motor ] and operable in one position for porting fluid flow from said charge pump selectively to the first and second of said conduit means, and in another position for by-passing fluid between the said first and second conduit means, said automatic valve means including housing means having first and second power chamber means [, said first power chamber being controlled by pressurized fluid from ] *selectively fluidly communicative with* said charge pump means [, said second power chamber being controlled by ] *and* said pump and motor means, [ whereby ] *and spool means responsive to* pressure changes in said power chamber means [ cause movement of said valve device means resulting in communicatively ] *for selectively* connecting [ or disconnecting ] said charge pump means *and said transmission*, and said pump and motor means.

2. The assembly of claim 1 wherein said [ automatic valving means housing ] means includes; a central bore means which carries a spring loaded sliding pin means.

3. The assembly of claim 2 wherein said central bore means is multi-diametered and said pin means extends into said first and second power chambers.

4. The assembly of claim 3 wherein said first and second power chambers are separated by [ a sliding ] means [.] *slidably carried in said central bore for selectively separating said chambers in response to said pin means and the pressure in said chambers.*

5. The assembly of claim 4 wherein said central bore means includes a first bore means slidingly carrying said pin means, a second bore means which includes said first power chamber and a third bore means which is said second power chamber; and said sliding means is spring loaded to a position between said first and second power chambers in said third bore means.

6. In a vehicle having an engine [and traction wheels with ] , a hydraulic transmission [and] *having a pump and motor*, a hydraulically actuated implement means operatively connected therebetween [including a pump and motor ] first conduit means connecting the pump outlet with the motor inlet and second conduit means connecting the motor outlet with the pump inlet so that the pump supplies fluid under pressure to drive the motor, and a variable angle swash plate mechanism in [the] *said* pump operable for varying the transmission ratio of [the] *said* transmission and for controlling direction of fluid flow between pump and motor according to desired vehicle movement, and a fluid charge pump driven by the engine and communicatively [connected] *connecting said transmission* to a fluid source, the combination therewith of automatic [,] valving means communicatively interconnectable between said charge pump and the first and second conduit means [interconnecting said pump and motor ] and operable in one position for porting fluid flow from said charge pump selectively to the first and second of said conduit means, and in another position for bypassing fluid between the said first and second conduit means, said automatic valve means including a housing means having a central bore means of first, second and third diameter area means, [said first area carrying] a sliding spring loaded pin means *carried in said first area means and* capable of extending into said second and third area means, a spring loaded valve ball means carried in said third area means, thereby creating adjacent power chamber means in said second and third diameter areas.

* * * * *